United States Patent
Scheying et al.

(10) Patent No.: US 7,128,945 B2
(45) Date of Patent: Oct. 31, 2006

(54) METHOD OF PRODUCING A MATERIAL LIBRARY

(75) Inventors: Gerd Scheying, Stuttgart (DE); Thomas Brinz, Bissingen Unter der Teck (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 10/214,788

(22) Filed: Aug. 8, 2002

(65) Prior Publication Data

US 2003/0047033 A1   Mar. 13, 2003

(30) Foreign Application Priority Data

Aug. 10, 2001   (DE) ................. 101 39 553

(51) Int. Cl.
*B05D 3/02* (2006.01)
*B05D 3/04* (2006.01)

(52) U.S. Cl. ............. 427/245; 427/190; 427/191; 427/195; 427/197; 427/199; 427/201; 427/243; 427/256; 427/331; 427/383.1; 427/385.5; 427/421.1

(58) Field of Classification Search ............... 427/256, 427/243, 377, 385.5, 421, 245, 190, 191, 427/195, 197, 199, 201, 331, 383.1, 427
See application file for complete search history.

(56) References Cited

U.S. PATENT DOCUMENTS

| 5,985,356 | A | | 11/1999 | Schultz et al. ............... 427/8 |
| 6,004,617 | A | * | 12/1999 | Schultz et al. ............... 427/8 |
| 6,030,917 | A | * | 2/2000 | Weinberg et al. ........... 502/104 |
| 6,519,032 | B1 | * | 2/2003 | Kuebler et al. ............. 356/337 |
| 2001/0039330 | A1 | * | 11/2001 | Schunk et al. ............... 530/350 |
| 2002/0028467 | A1 | * | 3/2002 | Sterzel et al. ............... 435/7.1 |
| 2002/0067120 | A1 | * | 6/2002 | Han et al. .................... 313/485 |

FOREIGN PATENT DOCUMENTS

| DE | 198 22 077 | 11/1999 |
| DE | 199 55 789 | 5/2001 |
| DE | 100 31 587 | 1/2002 |

* cited by examiner

*Primary Examiner*—Kirsten Jolley

(74) *Attorney, Agent, or Firm*—Kenyon & Kenyon LLP

(57) ABSTRACT

A method of producing a material library of surface areas having different properties is described, in which mixtures of substances are applied to a substrate by a combinatory method so that a combinatory system is obtained. At least two suspensions are used to produce the mixtures.

12 Claims, 1 Drawing Sheet

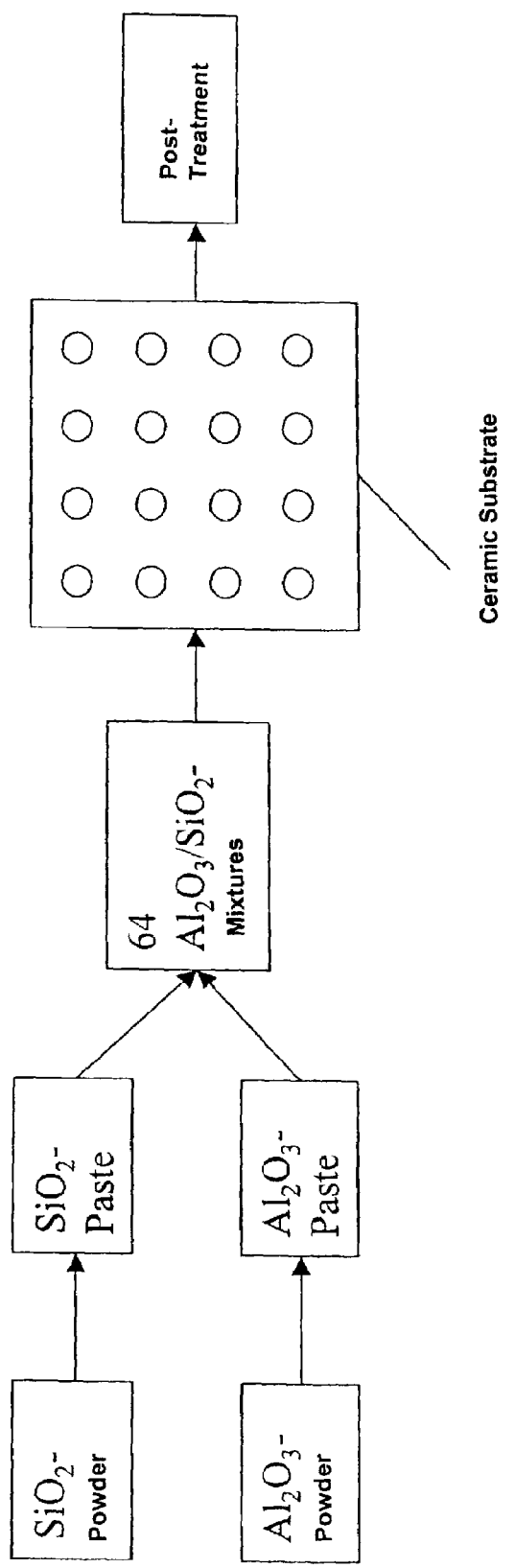

METHOD OF PRODUCING A MATERIAL LIBRARY

FIELD OF THE INVENTION

The present invention relates to a method of producing a material library from surface areas having different properties.

BACKGROUND INFORMATION

Conventional sputtering methods, among others, are used in combinatory chemistry for the synthesis of single-phase and multiphase surface systems, where materials of different chemical compositions are applied to a disk-shaped substrate, for example, a wafer, using an automated process known as high-throughput process. In this manner, surface systems having a plurality of areas with different surface compositions may be manufactured. The individual areas may be characterized regarding their physical and/or chemical properties by customary analytical methods, so that the surface composition best suited for the given application may be selected from among the differing and separately situated areas.

Conventionally, a sol/gel method for the synthesis of ceramic or metallic single-phase or multiphase systems. In this method different salts and salt mixtures are used as precursors, for example, and are converted to the desired coating materials using a sol/gel process. The sol/gel is then applied, using a dispensing process, to a substrate, which may be manufactured from a ceramic material. By applying different sols/gels in areas separated from one another, a combinatory library is produced, which may be evaluated analytically for its physical and/or chemical properties.

SUMMARY OF THE INVENTION

The method according to the present invention for producing a material library from surface areas having different properties, in which at least two suspensions are mixed for producing the mixtures, has the advantage that, by using suspensions, mixtures of materials which were not applicable for this purpose in processes such as the sol/gel process are also usable for producing a combinatory library. Thus, in the exemplary method according to the present invention, mixtures of metals, ceramics, and/or plastics, each present in a suspension, may be producible. By using single-component suspensions, any desired mixture may be produced from an unlimited number of materials.

In the exemplary method according to the present invention, which may be used in particular for mixing solid materials, a plurality of surface systems is produced, which form the combinatory library and are analyzable regarding their physical and/or chemical properties.

The exemplary method according to the present invention may be well suited for producing single-phase or multiphase surface systems. For example, a precious metal phase and a precious metal/ceramic phase may be present side-by-side.

The suspensions used according to an exemplary embodiment of the present invention may be present in any desired form. The suspensions may be liquid or almost solid, i.e., a paste, and may be homogeneously and thoroughly mixed in this state using appropriate equipment.

The term "suspension" may be understood in its broadest sense, i.e., any type of solids dispersed in any type of fluid are included. The suspension represents a stable disperse system, i.e., the solid particles are insoluble or only slightly soluble and do not or only slightly agglomerate in the solvent. Organic solvents or aqueous solvents may be used as the fluid, for example.

The solvents of the at least two suspensions may be the same or different. If they are of the same type, the suspensions and the mixtures may be jointly produced therefrom by introducing at least two different precursors in different, defined concentrations into a solvent, so that mixtures representing mixed suspensions are obtained. The mixtures thus obtained are applied to the substrate.

The substrate used in an exemplary method according to the present invention may be produced from a metallic material or a ceramic material or also from any desired material suited to the application at hand.

According to an exemplary embodiment of the method according to the present invention, a powdery precursor is used for producing the suspensions. The precursor may be a metallic compound or a semimetallic compound or a plastic. In particular, metallic or semimetallic oxidic or nitridic compounds are well suited for the exemplary method according to the present invention.

The particle size of the powdery precursors is between about 5 Å and about 10,000 Å, for example.

The use of mixtures, dopings, alloys, and/or blends of metals and/or plastics as precursors, i.e., for the production of the mixtures, is also possible.

As an example of a paste-like suspension, a plastic composite which represents a kind of thermoplastic may be softened and then mixed with another suspension. Other examples of suspensions include ceramic/metallic composites and metallic oxides.

Chemical reactions may occur between the precursors present in the individual suspensions. However, chemical reactions may also occur between the substrate and the mixtures applied thereto.

Furthermore, the mixtures applied and the substrate made of a ceramic material may adhere to one another after the material library has been produced.

According to an exemplary embodiment of a combinatory method, the suspensions are mixed using automated means.

If the surface system to be produced is to be a porous system, one of the at least two suspensions may represent a pore-forming suspension. For example, a pore-forming suspension may be carbon particles in an organic matrix, which may be burned off in a subsequent heat treatment. By using discrete amounts of such pore formers, the micromorphology of the surface systems produced may be adjusted in a controlled manner.

The combinatory system present after the application of the mixtures to the substrate may be subjected to a post-treatment. Thus, the combinatory system may be treated, for example, by post-treatment processes known as sintering processes. The combinatory system may be sintered, for example, at a defined temperature under a defined atmosphere and/or pressure.

The combinatory system may be heat-treated at a temperature between about 20° C. and about 2000° C., for example. This corresponds to the temperature range used in conventional sintering processes.

The combinatory system may also be exposed to pressure for post-treatment. This pressure may be between about 1 bar and about 20 bar, for example.

Furthermore, the combinatory system may be exposed to a certain gas atmosphere for post-treatment. Thus, when metals are used, the combinatory system may be exposed to a protective atmosphere composed of argon and/or nitrogen. When oxide-ceramic materials are used, air is a suitable atmosphere.

Exposing the combinatory system to a reducing gas atmosphere for post-treatment is also conceivable.

Post-treatment of the combinatory system may be performed in an area-specific manner, i.e., the individual surface areas having different compositions may be post-treated differently, for example, using different pressures and/or temperatures. Wet-chemical post-treatment of the combinatory system is also possible.

The mixtures are expediently applied to the substrate using a dispensing or micro-dispensing method. When using such a method, the mixtures are applicable in defined quantities and degrees of thickness.

BRIEF DESCRIPTION OF THE DRAWING

The FIGURE shows the sequence of the method according to an exemplary embodiment of the present invention.

DETAILED DESCRIPTION

In the exemplary method illustrated in the figure, in a first method step, two pasty suspensions are produced from two precursors. A $SiO_2$ powder and an $Al_2O_3$ powder are used as precursors. Water is used as the solvent, i.e., as the matrix of the paste-like suspensions. Silicon dioxide and aluminum oxide, respectively, have their thermodynamically stable form in an aqueous matrix, and have their metastable form under standard conditions.

The two pastes present as single-component suspensions are mixed in different proportions in a next method step using a dynamic or static mixer, so that in the present example 64 mixtures of different compositions are obtained. The 64 individual mixtures are applied to a substrate made of ceramic material each in a separate area. The figure shows only 16 of the 64 areas for the sake of clarity.

After the application of the 64 mixtures, a combinatory system is present. In a next step, this combinatory system is subjected to a heat treatment at a temperature of, for example, 500° C. under air atmosphere and normal pressure. After the end of the heat treatment, a combinatory library having 64 different surface systems is present, each of which may be studied using appropriate analytical methods. Depending on the mixing ratios and the subsequent heat treatment, thermodynamically stable mixed phases such as mullite are then formed under certain conditions.

What is claimed is:

1. A method of producing a material library of surface areas having different properties, the method comprising:
   mixing at least two suspensions to produce at least one mixture of at least one substance;
   applying the at least one mixture to a substrate by a combinatory method so that a combinatory system is obtained;
   forming pores in the at least one mixture after application of the at least one mixture to the substrate in the applying step; and
   selecting a discrete amount of pore formers in at least one of the at least two suspensions so as to adjust in a controlled manner the micromorphology of a surface system produced.

2. The method according to claim 1,
   wherein a powdery precursor is used to produce each suspension.

3. The method according to claim 2,
   wherein the powdery precursor includes at least one of a metallic compound and a semimetallic compound.

4. The method according to claim 2,
   wherein the powdery precursor includes a plastic.

5. The method according to claim 1,
   wherein the at least two suspensions are mixed using an automatic arrangement.

6. The method according to claim 1, further comprising:
   heat treating the corribinatory system at a temperature between about 20° C. and about 2000° C.

7. The method according to claim 1, further comprising:
   subjecting the combinatory system to a pressure between about 10 bar and about 20 bar.

8. The method according to claim 1, further comprising:
   exposing the combinatory system to a protective gas atmosphere.

9. The method according to claim 1, further comprising:
   exposing the combinatory system to a reducing gas atmosphere.

10. The method according to claim 1,
    wherein the applying step includes applying the at least one mixture to the substrate by at least one of a dispensing method and a micro-dispensing method.

11. The method of claim 1,
    wherein the at least one mixture includes carbon particles in an organic matrix.

12. The method of claim 1, wherein:
    the pores are formed by heat treating the substrate.

* * * * *

UNITED STATES PATENT AND TRADEMARK OFFICE
CERTIFICATE OF CORRECTION

| | | |
|---|---|---|
| PATENT NO. | : 7,128,945 B2 | Page 1 of 1 |
| APPLICATION NO. | : 10/214788 | |
| DATED | : October 31, 2006 | |
| INVENTOR(S) | : Gerd Scheying et al. | |

It is certified that error appears in the above-identified patent and that said Letters Patent is hereby corrected as shown below:

Column 1, line 25, change "Conventionally, a sol/gel method...multiphase systems." to --Conventionally, a sol/gel method is used for the ...--

Signed and Sealed this

Eighteenth Day of September, 2007

JON W. DUDAS
*Director of the United States Patent and Trademark Office*